US012695304B2

(12) United States Patent
Anaparthi et al.

(10) Patent No.: US 12,695,304 B2
(45) Date of Patent: Jul. 28, 2026

(54) SYSTEM AND METHOD FOR DAMPING OSCILLATIONS IN POWER SYSTEMS

(71) Applicant: Fluence Energy, LLC, Arlington, VA (US)

(72) Inventors: Krishna Kumar Anaparthi, Garching bei Muenchen (DE); Hernan Rochina Perez, Valencia (ES); Sung Pil Oe, Tonbridge (GB)

(73) Assignee: FLUENCE ENERGY, LLC, Arlington, VA (US)

( * ) Notice: Subject to any disclaimer, the term of this patent is extended or adjusted under 35 U.S.C. 154(b) by 596 days.

(21) Appl. No.: 18/116,088

(22) Filed: Mar. 1, 2023

(65) Prior Publication Data

US 2024/0297500 A1 Sep. 5, 2024

(51) Int. Cl.
*H02J 3/0014* (2026.01)
*G05B 19/042* (2006.01)
(Continued)

(52) U.S. Cl.
CPC .......... *H02J 3/0014* (2026.01); *G05B 19/042* (2013.01); *H02J 3/18* (2013.01);
(Continued)

(58) Field of Classification Search
CPC ........ H02J 3/24; H02J 3/18; H02J 7/32; H02J 2207/20; H02J 3/1842; H02J 3/241;
(Continued)

(56) References Cited

U.S. PATENT DOCUMENTS

| | | | |
|---|---|---|---|
| 5,041,959 A | 8/1991 | Walker | |
| 5,798,633 A * | 8/1998 | Larsen | ...................... H02J 3/38 323/207 |

(Continued)

FOREIGN PATENT DOCUMENTS

| | | |
|---|---|---|
| CN | 114465271 A | 5/2022 |
| WO | 2018222858 A1 | 12/2018 |

OTHER PUBLICATIONS

Notice of Allowance for U.S. Appl. No. 17/810,983, dated Jun. 22, 2023, 9 pages.

(Continued)

*Primary Examiner* — Charles Cai

(74) *Attorney, Agent, or Firm* — Buchanan Ingersoll & Rooney PC

(57) ABSTRACT

A power oscillation damping controller includes a control block including one or more circuits configured to receive a meter input and transmit a controller output. The meter input includes an active power sub-controller measured value including an evident oscillation component of a power oscillation, a reactive power sub-controller measured value including an alternative oscillation component of the power oscillation, or a combination thereof. The controller output includes an active power component adjustment based on the active power sub-controller measured value that configures or results in an evident dampening of the power oscillation, a reactive power component adjustment based on the reactive power sub-controller measured value that configures or results in an alternative dampening of the power oscillation, or a combination thereof.

20 Claims, 7 Drawing Sheets

(51) Int. Cl.
    *H02J 3/18*         (2026.01)
    *H02J 7/32*         (2006.01)

(52) U.S. Cl.
    CPC ........ *H02J 7/32* (2013.01); *G05B 2219/2639*
        (2013.01); *H02J 2207/20* (2020.01)

(58) Field of Classification Search
    CPC .......... H02J 3/32; H02J 3/381; G05B 19/042;
        G05B 2219/2639
    See application file for complete search history.

(56)           References Cited

U.S. PATENT DOCUMENTS

| | | |
|---|---|---|
| 2007/0002536 A1 | 1/2007 | Hall et al. |
| 2010/0059270 A1 | 3/2010 | Yeh et al. |
| 2010/0109447 A1* | 5/2010 | Achilles .................. H02J 3/381 |
| | | 307/153 |
| 2012/0086399 A1 | 4/2012 | Choi |
| 2013/0175871 A1* | 7/2013 | Knuppel ................... H02J 3/48 |
| | | 307/102 |
| 2014/0032000 A1* | 1/2014 | Chandrashekhara ..... H02J 3/40 |
| | | 700/292 |
| 2014/0210419 A1 | 7/2014 | Kim |
| 2014/0232357 A1 | 8/2014 | Huomo |
| 2015/0003009 A1 | 1/2015 | Moore et al. |
| 2015/0194707 A1 | 7/2015 | Park |
| 2015/0372517 A1 | 12/2015 | Lee |
| 2015/0381089 A1 | 12/2015 | Tarnowski et al. |
| 2017/0155247 A1* | 6/2017 | Liu ........................... H02J 3/18 |
| 2017/0294633 A1 | 10/2017 | Zimbru, Jr. et al. |
| 2018/0142935 A1 | 5/2018 | Jacobi |
| 2020/0144845 A1 | 5/2020 | Facchini et al. |
| 2021/0281081 A1 | 9/2021 | Singer et al. |
| 2025/0118961 A1* | 4/2025 | Skjelmose ........... G06Q 10/063 |
| 2025/0226659 A1* | 7/2025 | Shao ........................ H02J 3/24 |

OTHER PUBLICATIONS

Umuhoza et al., "A SiC-Based Power Electronics Interface for Integrating a Battery Energy Storage into the Medium (13.8 kV) Distribution System," 2018 IEEE Applied Power Electronics Conference and Exposition (APEC), San Antonio, TX, USA, 2018, pp. 2387-2392.

Notification of Transmittal of the International Search Report (Forms PCT/ISA/220 and PCT/ISA/210) and the Written Opinion of the International Searching Authority (Form PCT/ISA/237) issued Dec. 11, 2023, by the Commissioner for Patent in corresponding International Application No. PCT/US2023/026408 (12 pages).

International Search Report and Written Opinion for International Application No. PCT/US22/44366, mailed Jan. 6, 2023, 13 pages.

International Search Report and Written Opinion for International Application No. PCT/US21/30551, mailed Aug. 13, 2021, 14 pages.

* cited by examiner

Battery Node (e.g., Cube) 110A

Battery Elements 310A-F (e.g., Battery Racks)

Battery Element 310A (e.g., Battery Rack)

Battery Cells 312A-N

Battery Cell 312A

*FIG. 4A*

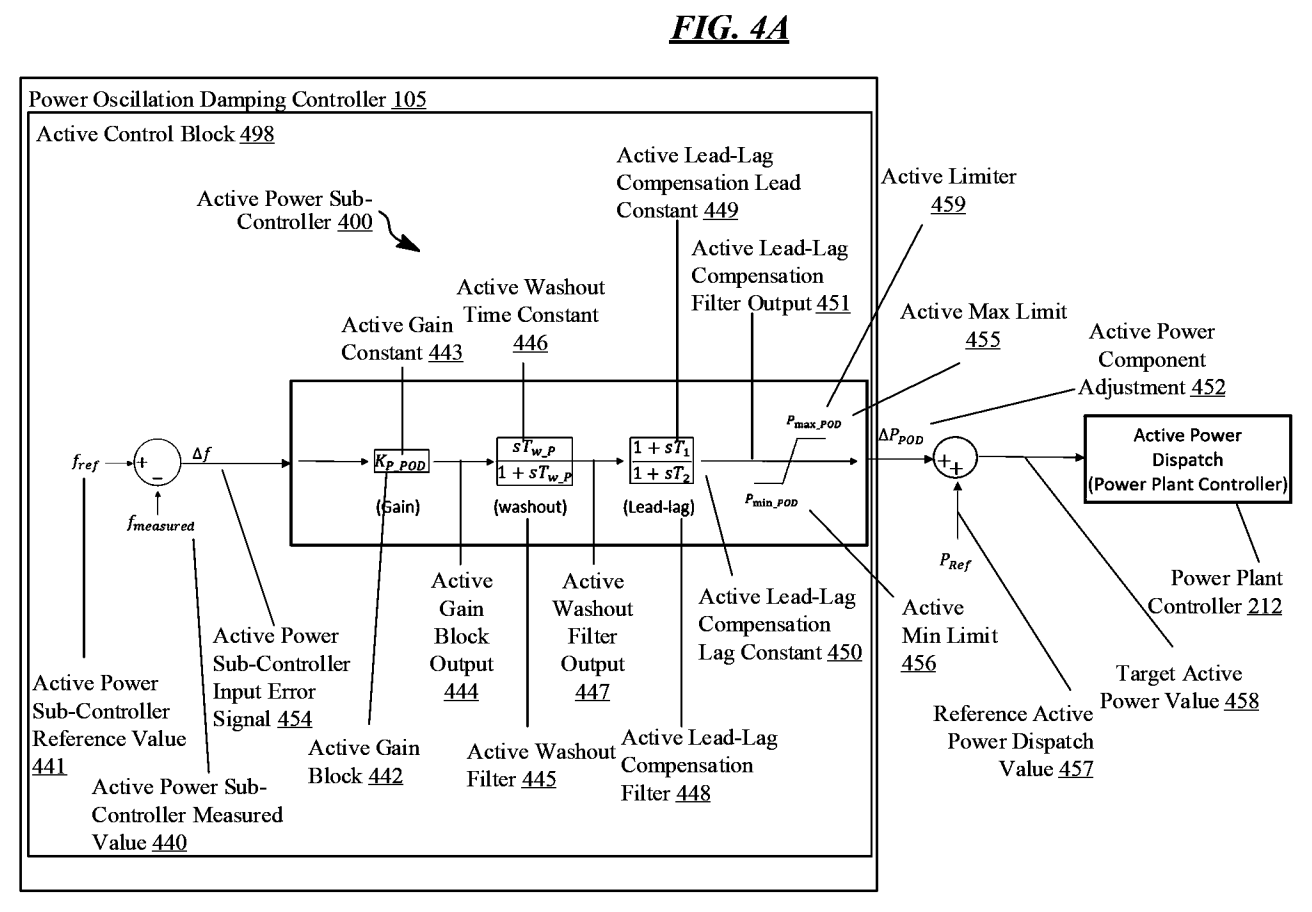

Power Oscillation Damping Controller 105

Active Control Block 498

Active Power Sub-Controller 400

Active Gain Constant 443

Active Washout Time Constant 446

Active Lead-Lag Compensation Lead Constant 449

Active Limiter 459

$f_{ref}$ $\Delta f$ $f_{measured}$

Active Power Sub-Controller Input Error Signal 454

Active Power Sub-Controller Reference Value 441

Active Power Sub-Controller Measured Value 440

$K_{P\_POD}$ (gain)

Active Gain Block 442

Active Gain Block Output 444

$\dfrac{sT_{w\_P}}{1 + sT_{w\_P}}$ (washout)

Active Washout Filter 445

Active Washout Filter Output 447

$\dfrac{1 + sT_1}{1 + sT_2}$ (lead-lag)

Active Lead-Lag Compensation Filter 448

Active Lead-Lag Compensation Lag Constant 450

$P_{max\_POD}$ $P_{min\_POD}$

Active Lead-Lag Compensation Filter Output 451

Active Max Limit 455

Active Min Limit 456

$\Delta P_{POD}$

Active Power Component Adjustment 452

$P_{Ref}$

Reference Active Power Dispatch Value 457

Target Active Power Value 458

Active Power Dispatch (Power Plant Controller)

Power Plant Controller 212

*FIG. 5*

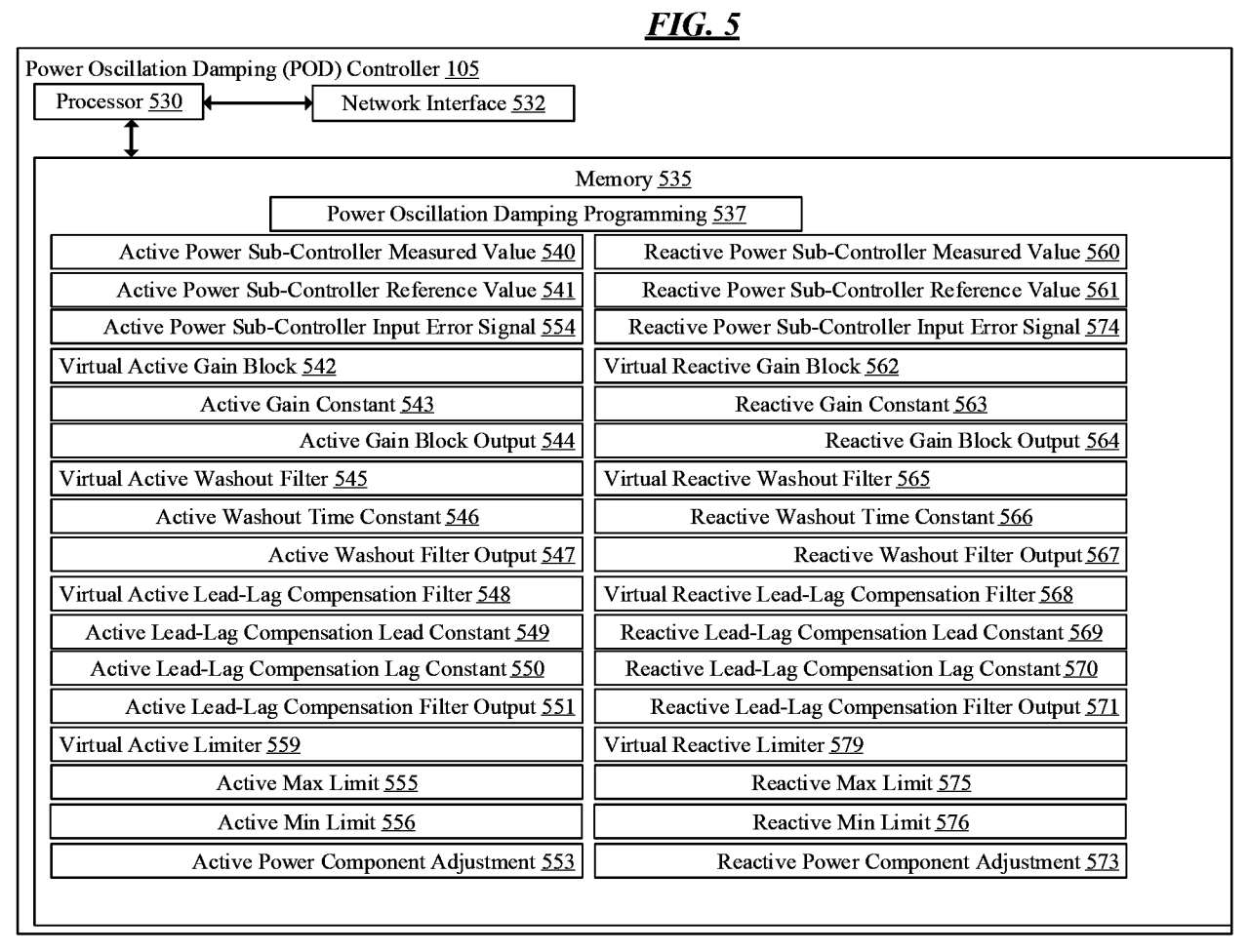

Power Oscillation Damping (POD) Controller 105

Processor 530

Network Interface 532

Memory 535

Power Oscillation Damping Programming 537

Active Power Sub-Controller Measured Value 540

Active Power Sub-Controller Reference Value 541

Active Power Sub-Controller Input Error Signal 554

Virtual Active Gain Block 542

Active Gain Constant 543

Active Gain Block Output 544

Virtual Active Washout Filter 545

Active Washout Time Constant 546

Active Washout Filter Output 547

Virtual Active Lead-Lag Compensation Filter 548

Active Lead-Lag Compensation Lead Constant 549

Active Lead-Lag Compensation Lag Constant 550

Active Lead-Lag Compensation Filter Output 551

Virtual Active Limiter 552

Active Max Limit 555

Active Min Limit 556

Active Power Component Adjustment 553

Reactive Power Sub-Controller Measured Value 560

Reactive Power Sub-Controller Reference Value 561

Reactive Power Sub-Controller Input Error Signal 574

Virtual Reactive Gain Block 562

Reactive Gain Constant 563

Reactive Gain Block Output 564

Virtual Reactive Washout Filter 565

Reactive Washout Time Constant 566

Reactive Washout Filter Output 567

Virtual Reactive Lead-Lag Compensation Filter 568

Reactive Lead-Lag Compensation Lead Constant 569

Reactive Lead-Lag Compensation Lag Constant 570

Reactive Lead-Lag Compensation Filter Output 571

Virtual Reactive Limiter 579

Reactive Max Limit 575

Reactive Min Limit 576

Reactive Power Component Adjustment 573

Power Oscillation Damping Performance Graph 600

SYSTEM AND METHOD FOR DAMPING OSCILLATIONS IN POWER SYSTEMS

TECHNICAL FIELD

The present subject matter relates to examples of capabilities of damping power oscillations by means of a battery energy storage system, in particular damping power oscillations at a plant level.

BACKGROUND

A battery energy storage system typically includes a multitude of individual battery modules to charge and discharge power: in particular, these battery modules work in concert to provide a power electronic based inverter with direct current (DC) power, which the inverter then converts to alternating current (AC) power to be exchanged with the electrical grid.

Traditionally, across the electrical grid, power oscillations would be dampened by power system stabilizers (PSS) within conventional generator excitation systems (turbine systems fueled by coal, gas, oil)—and power-electronic based power plants such as battery energy storage systems, solar panel installations, and wind farms, were not required to stabilize the grid, as they provided a relatively small proportion of the total electrical grid power output. However, as conventional generators are increasingly decommissioned, there is a commensurate decrease in the stabilizing capability, previously provided by the conventional generators, available in the system. Power-electronic based power plants such as battery energy storage system will need to provide this damping effect on the grid as their total percentage power output relative to the electrical grid increases.

SUMMARY

Hence, there is a need for methods directed to damping power oscillations in a battery energy storage system. The power oscillation damping technologies disclosed herein are able to detect, via a meter, the power oscillation of a high-voltage connection to a power grid, in order to determine whether a sufficiently material oscillation needs to be dampened, and further to dampen, via a battery energy storage system, through its active power controller component and/or a reactive power controller component.

In a first example, a power oscillation damping controller includes a control block including one or more circuits configured to receive a meter input and transmit a controller output. The meter input includes an active power and/or frequency measurement including an evident oscillation component of a power oscillation, a reactive power and/or voltage measurement including an alternative oscillation component of the power oscillation, or a combination thereof. The controller output includes an active power adjustment based on the active power and/or frequency measurement that configures or results in an evident dampening of the power oscillation, a reactive power adjustment based on the reactive power and/or voltage measurement that configures or results in an alternative dampening of the power oscillation, or a combination thereof.

In a second example, a battery energy storage system includes a power conversion system, configured to convert between a direct current power and an alternating current power. The battery energy storage system further includes a battery core including an array of battery cubes, configured to provide the direct current power to the power conversion system, and a point of connection, configured to couple the power conversion system to an electrical grid. The battery energy storage system still further includes a meter, configured to measure the grid voltage, frequency, an active power sub-controller measurement of the alternating current power and a reactive power sub-controller measurement of the alternating current power, and a power oscillation damping controller, configured to provide an active power component adjustment based upon the active power and/or frequency measurement, and a reactive power component adjustment based upon the reactive power and/or voltage measurement.

In a third example, a power oscillation damping controller includes a processor and a memory accessible to the processor and programmed to configure the power oscillation damping controller. The power oscillation damping controller is configured to receive an active power and/or frequency measurement including an evident oscillation component of a power oscillation. The power oscillation damping controller is configured to receive a reactive power and/or voltage measurement including an alternative oscillation component of a power oscillation. The power oscillation damping controller is configured to calculate an active power component adjustment based on the evident oscillation component of the active power and/or frequency measurement. The power oscillation damping controller is configured to calculate a reactive power component adjustment based on the alternative oscillation component of the reactive power and/or voltage measurement. The power oscillation damping controller is configured to transmit the active power component adjustment. The power oscillation damping controller is configured to transmit the reactive power component adjustment.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accordance with the present concepts, by way of example only, not by way of limitations. In the figures, like reference numerals refer to the same or similar elements.

FIG. 4A is a control block diagram of the active power sub-controller of the power oscillation damping controller that can either be implemented physically or virtually.

FIG. 5 is a block diagram of a power oscillation damping controller with virtually-implemented active power and reactive power sub-controllers.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, transfer functions, and/or circuitry have been described at a relatively high-level, without detail, in order to avoid unnecessarily obscuring aspects of the present teachings.

The term "coupled" as used herein refers to any logical, physical, electrical, or optical connection, link or the like by which signals or light produced or supplied by one system element are imparted to another coupled element. Unless described otherwise, coupled elements or devices are not necessarily directly connected to one another and may be separated by intermediate components, elements, or communication media that may modify, manipulate or carry the light or signals.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as +10% from the stated amount. The terms "approximately" and "substantially" mean that the parameter value or the like varies up to +10% from the stated amount.

The orientations of the battery nodes, racks, elements, modules, or cells; associated components; circuits; and/or any complete devices, such as battery energy storage systems, incorporating battery nodes, racks, elements, modules, or cells such as shown in any of the drawings, are given by way of example only, for illustration and discussion purposes. In operation for a particular battery energy storage application, a battery node, rack, element, module, or cell may be oriented in any other direction suitable to the particular application of the battery energy storage system, for example upright, sideways, or any other orientation. Also, to the extent used herein, any directional term, such as left, right, front, rear, back, end, up, down, upper, lower, top, bottom, and side, are used by way of example only, and are not limiting as to direction or orientation of any energy storage system or battery nodes, racks, elements, modules or cells; or component of an energy storage system or battery node, rack, element, module, or cell examples illustrated in the accompanying drawings and discussed below.

Figure 1:
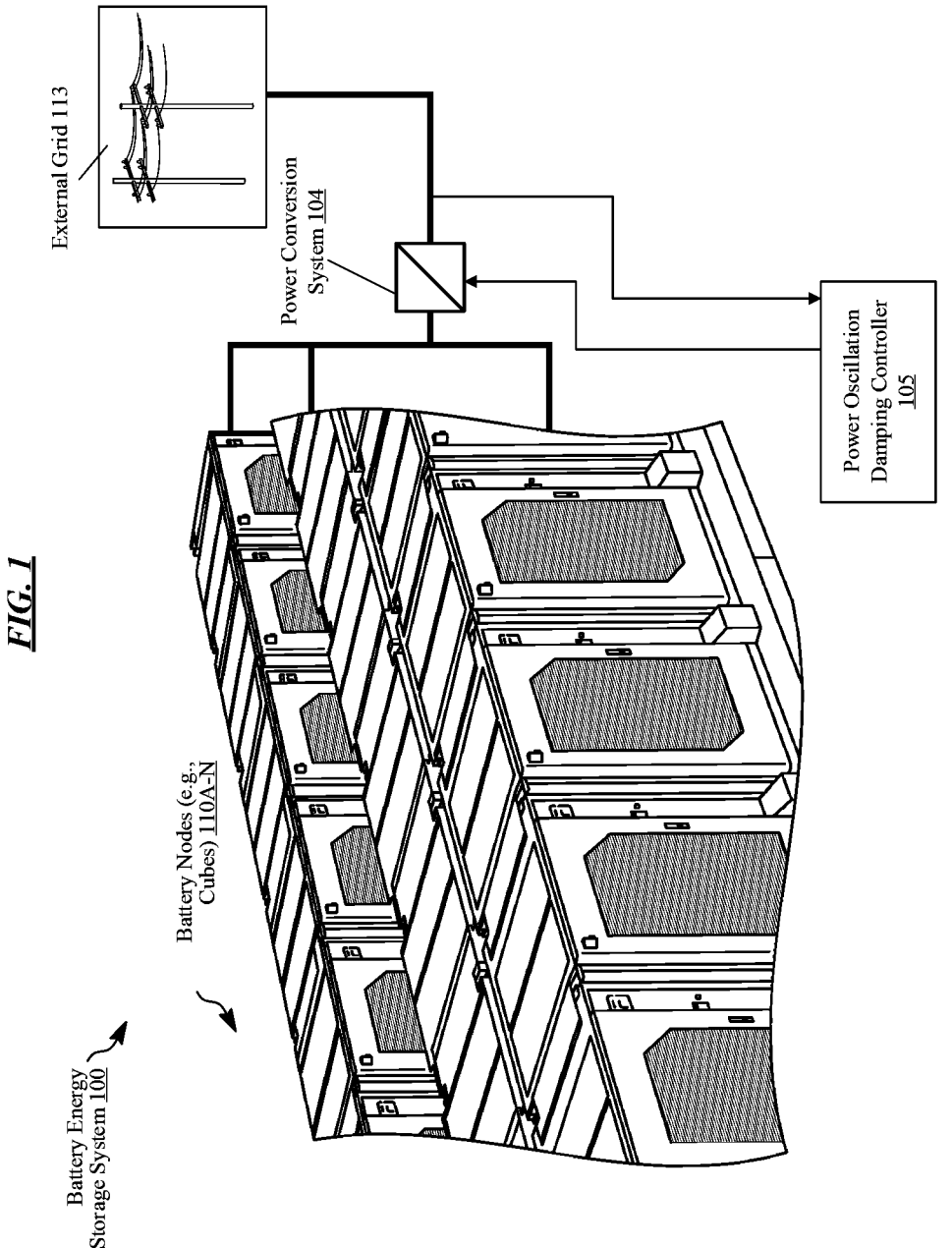
FIG. 1 is an isometric view of a battery energy storage system that includes multiple battery nodes and a power oscillation damping controller.

FIG. 1 is an isometric view of a battery energy storage system 100. The battery energy storage system 100 includes multiple battery nodes 110A-N with power oscillation damping (POD) controller 105. The battery nodes 110A-N include batteries of any existing or future reusable battery technology including lithium ion or flow batteries. The battery nodes 110A-N, collectively and individually, are capable of providing direct current electricity to an external load, and thereby discharging, as well as are capable of receiving direct current electricity from an external source, and thereby charging. The POD controllers 105 may operate completely independently, in a fully centralized manner, or in some combination of independent and centralized operation.

To facilitate providing and receiving direct current, the battery nodes 110A-N are connected to one or more power conversion systems 104. The power conversion system 104 is configured to standardize power inputs and outputs to and from the battery nodes 110A-N. As the battery nodes 110A-N provide direct current, the power conversion system 104 either transforms direct current into alternating current for use by a connected load 106, normalizes the direct current from the battery nodes 110A-N to the external grid 113, or simply passes the direct current from the battery nodes 110A-N to the external grid. Additionally, as the battery nodes 110A-N require direct current, the power conversion system 104 either transforms alternating current into direct current from the external grid, normalizes the direct current from the external grid 113 to the battery nodes 110A-N, or simply passes the direct current from the external grid 113 to the battery nodes 110A-N.

The power conversion system 104 is depicted with a single connection to the external grid 113 to the power conversion system 104: in scenarios where the external grid 113 is complex and connects to multiple energy sources and connected loads, such as a power grid with consumption devices, a single connection to the battery energy storage system 100 can either absorb energy produced by the energy sources of the external grid 113 in excess of the demand of the connected loads of the external grid 113, or provide energy to the connected loads of the external grid 113 in excess of the capacity of the energy sources of the external grid 113. Alternatively, separate lines may run to a segregated energy source as well as to connected loads or the external grid 113: separate lines may be advantageous in scenarios where the segregated energy source is inconsistent, such as a wind or solar-based energy source. In such scenarios, the power from the energy source is pushed to the battery nodes 110A-N via the power conversion system 104, which then either charge or discharge, and provide consistent energy to the connected loads or external grid 113 via another electrical route from the power conversion system 104.

The power conversion system 104 can facilitate normalizing input or output wattage or voltage, in order to provide consistent output and protect the battery nodes 110A-N, energy source 102, or connected load 106 from damage.

The energy source 102 can be any suitable system for producing electrical energy, such as a turbine or photovoltaic cell. The connected load 106 can include a power grid or a smaller local load such as a backup power system for a facility such as a hospital, manufacturing site, residential home, or other suitable facility.

Generally, the battery nodes 110A-N of the battery energy storage system 100 connected to a power conversion system 104 or group of power conversion systems 104 operate in concert: either providing power to a connected load 106 and discharging, or receiving power from an energy source 102 and charging. This concerted effort is coordinated by a core controller 112, which is informed by the POD controller 105 during a power oscillation event. Further methods and systems related to the management and maintenance of the battery nodes 110A-N of the battery energy storage system 100 are disclosed in U.S. application Ser. No. 17/810,983, filed on Jul. 6, 2022, titled "Cell and Rack Performance Monitoring System and Method," the entirety of which is incorporated by reference herein.

Figure 2:
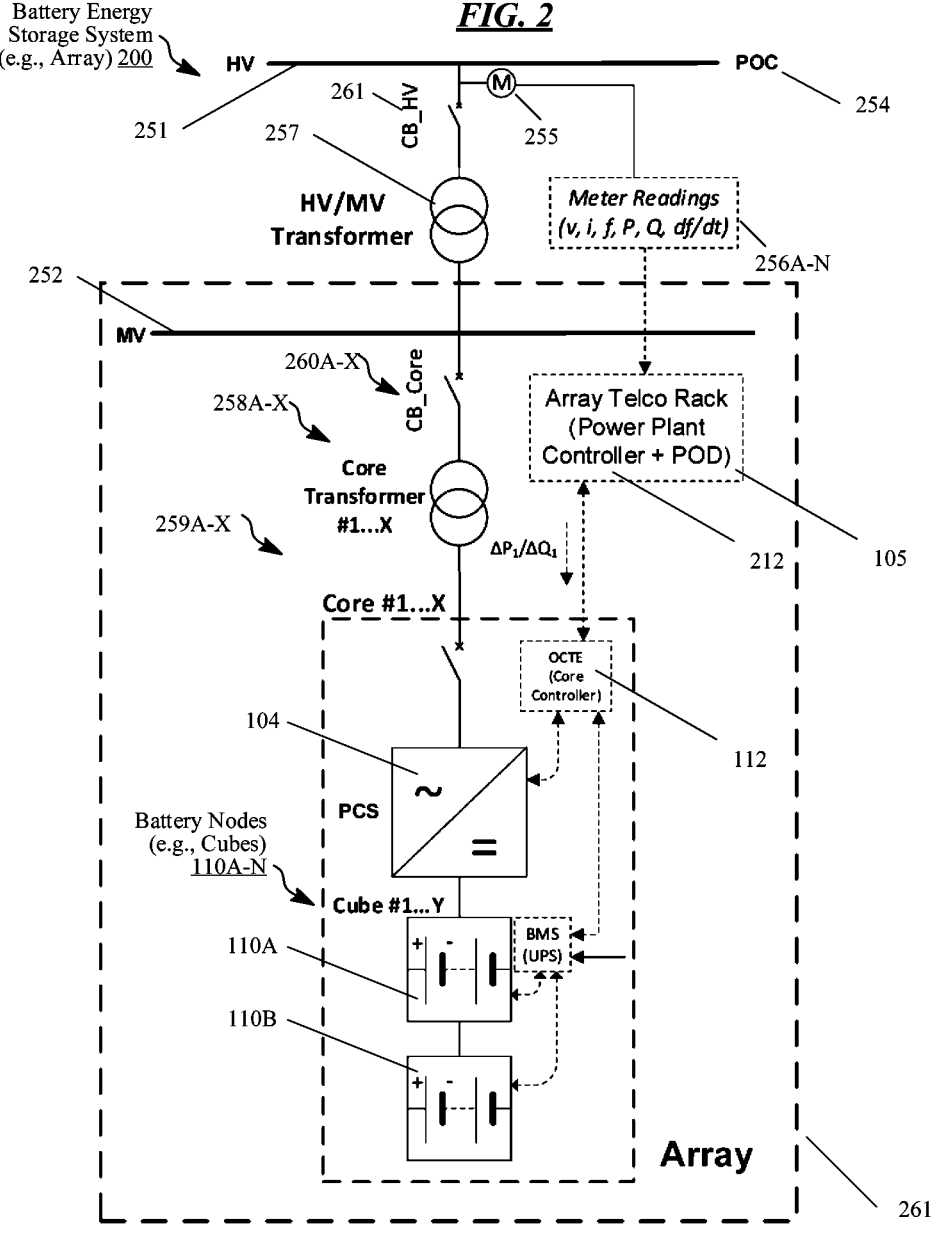
FIG. 2 is an electrical diagram of a battery energy storage system similar to that of FIG. 1 depicting information and working power flows.

FIG. 2 is an electrical diagram of a battery energy storage system 200 similar to the battery energy storage system 100 of FIG. 1 depicting information and working power flows.

The battery energy storage system 200 connects to an electrical grid, including both an energy source 102 and a connected load 106, via a point of connection (POC) 254. The POC 254 is coupled to a high voltage (HV) bus 251, which is an electrical bus rated and intended for high voltage matching the voltage expected by the electrical grid. The HV bus 251 can allow for multiple battery energy storage systems 200 or power storage or generating facilities to be linked in series or in parallel before connecting to an electrical grid via the POC 254.

The battery energy storage system 200 includes an HV circuit breaker 261, designed to selectively isolate the remainder of the battery energy storage system 200 from the HV bus 251. The HV circuit breaker 261 may be hardwired to trip under certain circumstances, or the HV circuit breaker 261 may be controlled by the power plant controller 212 or other controllers.

An HV/medium voltage (MV) transformer 257 is coupled between the HV bus 251 and an MV bus 252. The HV/MV transformer steps the voltage experienced at the HV bus connection end 251 down to the voltage expected at the MV bus 252 connection end, as well as stepping up the voltage from the MV bus 252 connection end to the voltage expected at the HV bus 251 connection end.

The MV bus 252 is within the bounds of the array 261. The array 261 includes a power plant controller 212 which itself includes a power oscillation damping (POD) controller 105, to facilitate operation of one or more cores 259A-X. While multiple arrays 261 may be coupled in series or in parallel to the MV bus 252, in this example only a single array 261 with a single power plant controller 212 and a single POD controller 105 is depicted.

A core 259A is coupled to the MV bus 252 by a core transformer 258A and a core circuit breaker 260A. Multiple cores 259A-X are connected to a single MV bus 252, each with a respective core transformer 259A-X and respective core circuit breaker 260A-X: in this figure, only a single core 259A is depicted in detail.

The MV circuit breaker 260A is designed to selectively isolate the remainder of the core 259A from the MV bus 252. The MV circuit breaker 252 may be hardwired to trip under certain circumstances, or the MV circuit breaker 252 may be controlled by the power plant controller 212, the core controller 112, or other controllers.

The core transformer 258A is coupled between the MV bus 252 and the core 259A. The core transformer 258A steps the voltage experienced at the MV bus connection end 252 down to the voltage expected at the core 259A connection end, as well as stepping up the voltage from the core 259A connection end to the voltage expected at the MV bus 252 connection end.

The core 259A includes the power conversion system 104, which includes all hardware and controls to convert bi-directionally between direct current (DC) and alternating current (AC) power. The power conversion system 104 provides AC power to and from the MV bus 252, and provides DC power to and from the cubes 110A-N.

A meter 255 is connected near the HV bus 251 for the purpose of collecting at least measured values relevant to oscillation determinations: instant voltage, current, as well as power frequency, instant power, and the rate of change of frequency, are all values that can inform the power plant controller 212 and the POD controller 105 in dampening power oscillations.

The meter readings 256A-N are collected continuously or periodically by the meter, and are provided to the power plant controller 212 and the POD controller 105.

The POD controller 105, to be described in further detail in later figures, utilizes the meter readings 256A-N to determine an adjustment to both the active power provided by the array 261, as well as the reactive power provided by the array 261. Based on these adjustments, the power plant controller 212 is able to direct the cubes 110A-N to increase or decrease the active power produced by the cubes to reduce the system oscillation occurring in the electrical grid—in particular, the system oscillation due primarily to active power. Additionally, the power plant controller 212 is able to direct the power conversion system (PCS) 104 to modulate active and reactive power in a such a manner that the BESS 200 enhances the safe operation of the power system and effectively contributes to the damping of power oscillations at the point of observation of the power oscillation.

Figure 3:
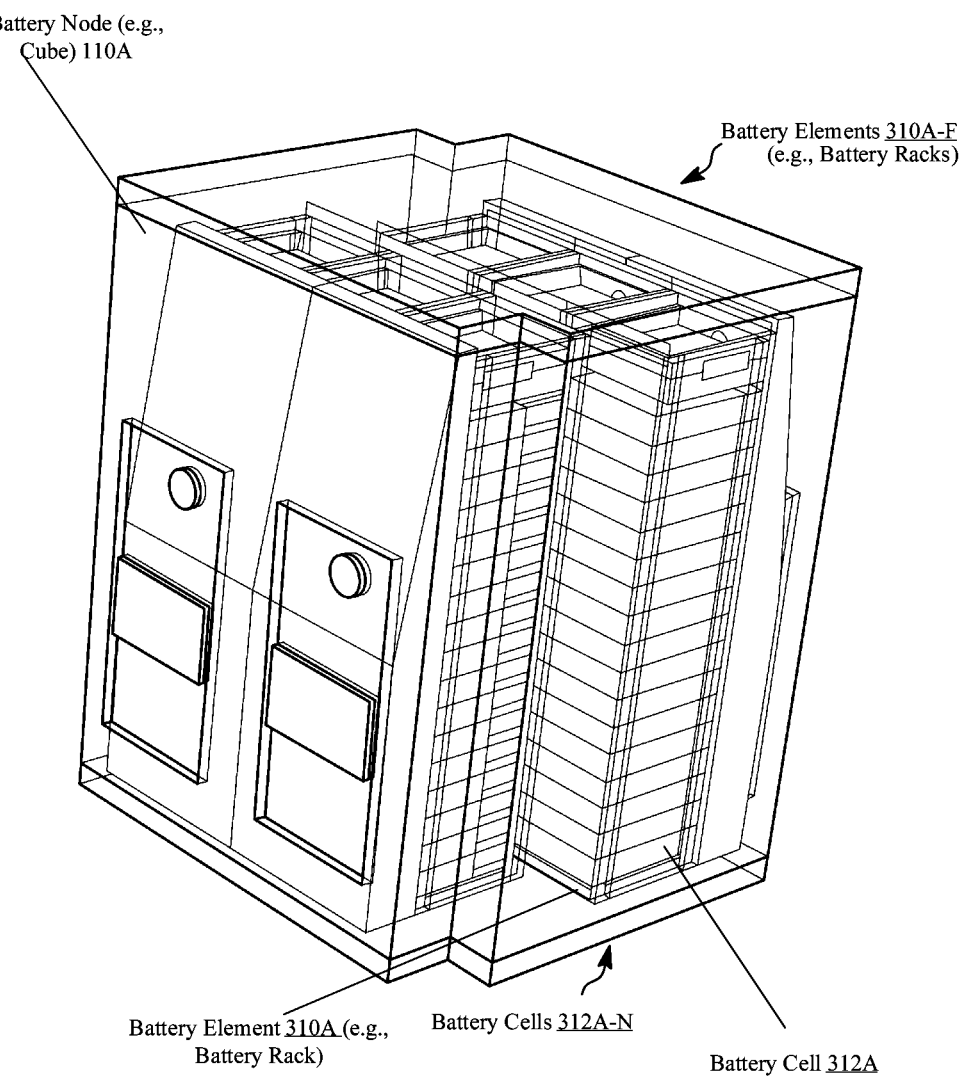
FIG. 3 is an isometric translucent view of the battery nodes of FIG. 1 that includes multiple battery elements of multiple battery modules.

FIG. 3 is an isometric view of a battery node 110A that includes multiple battery elements 310A-F of multiple battery cells 312A-N. The battery node 110A stores a plurality of battery elements 310A-F. The battery node 110A is both a physical collection of battery elements 310A-F, as well as a logical and electrical collection of battery elements 310A-F: the battery node 110A physically houses the battery elements 310A-F, and the electrical performance of the battery elements 310A-F within the battery node 110A may be attributed to the battery node 110A itself. For example, if a battery element 310A is able to store one hundred and two kilowatt hours of energy, and the battery node 110A contains six battery elements 310A-F, then the battery node 110A may be understood to and be described as storing six hundred and twelve kilowatt hours of energy. A battery node 110A may contain greater or fewer numbers of battery elements 310A than depicted in the figure.

A given battery element 310A contains multiple battery cells 312A-N. Much like the relationship between a battery node 110A and contained battery elements 310A-F, the battery element 310A is both a physical collection of battery cells 312A-N as well as a logical and electrical collection of battery cells 312A-N. As an example, if a battery cell 312A is able to store six kilowatt hours of energy, and the battery element 310A contains seventeen battery cells 312A-N, then the battery element 310A may be understood to and be described as storing one hundred and two kilowatt hours of energy. A battery element 310A may contain greater or fewer numbers of battery cells 312A than depicted in the figures.

As the battery element 310A is a logical and electrical collection of battery cells 312A-N, the collection is not defined by the physical structure or ordering of the battery cells 312A-N. Therefore, the battery element 310A may be alternatively described as a battery rack, a battery sub-rack, or a battery array: each of these terms (element, rack, sub-rack, array) are categories of battery element 310A: a battery element 310A is the logical and electrical collection of battery cells 312A-N, without explicit regard for physical structure or ordering of the battery cells 312A-N. In some implementations, a finer level of encapsulation exists within the battery cell 312A, which may be identified as a battery sub-cell within the battery cell 312A, comprising prismatic, pouch, or cylindrical battery cells.

The battery node 110A represents a single physical fixture, which may be limited in maximum size by the mass or volume a person, forklift, or vehicle is capable of transporting as a singular, atomic unit. The battery element 310A within the battery node 110A represents an organizational structure for organizing and stacking battery cells within the battery node 110A. A battery cell 312A is generally the largest unit of manufacture a battery producer can produce capable of charging and discharging electricity at a chemical level. Battery cells 312A-N are grouped into battery modules, which represents the smallest unit a particular operator would remove or replace in the energy storage system 100: in examples where a single battery module includes multiple battery cells, the individual battery cells are too small or sensitive to perform on-site particularized maintenance, and instead the entire battery module is either collectively repaired or replaced.

The battery node 110A may resemble the features presented in the energy storage system described in International Application No. PCT/US2021/30551, filed on May 4, 2021, titled "Energy Storage System with Removable, Adjustable, and Lightweight Plenums," the entirety of which is incorporated by reference herein.

FIG. 4A is a control block 498 diagram of the active power sub-controller 400 of the power oscillation damping controller 105 that can either be implemented physically or virtually. The active power sub-controller 400 is a series of physical circuits or virtualized circuits or transfer functions, configured to determine an active power component adjustment 452 to provide to the power plant controller 212. The power plant controller 212 is able to use the active power component adjustment 452 to alter the active power output of the battery energy storage system 200 in order to dampen power oscillations observed at the point of connection (POC) 254. The active power sub-controller 400 is primarily an active gain block 442, an active washout filter 445, an active lead-lag compensation filter 448, and an active limiter 459. However, a circuit may be attached between, or a transfer function may operate between, the meter 255 and the active gain block 442 to determine an active power sub-controller input error signal 454. The active power sub-controller input error signal 454 is the difference, error, or delta value in electrical frequency between an instant active power sub-controller measured value 440, which is the measurement provided by the meter 255, and an active power sub-controller reference value 441, which is a desired electrical frequency often associated with a reference frequency of the associated POC 254.

The active power sub-controller measured value 440 is an instantaneous electrical frequency value of the electrical frequency measured at the meter 255. The active power sub-controller 400 is continually providing a series of discretized active power component adjustments 452 to the power plant controller 112, thereby approximating an analog wave of active power component adjustments 452 devised to dampen the power oscillations of the electrical grid connected at the POC 254.

The active gain block 442 is provided the active power sub-controller input error signal 454. In some examples, the active gain block 442 can be configured with an active gain constant 443.

The active washout filter 445 is provided the active gain block output 444 signal. The active washout filter 445 is designed to filter out active power sub-controller input error signal 454 which are lower than an active washout time constant 446, in order for the POD controller 105 to not output de minimis active power component adjustments 452. The active washout time constant 446 can be configured in some cases. For example, if the operator desires to washout power oscillations of less than 0.1 Hz then the active washout time constant 446 is set to 10; the filter will wash out sensed input signals that is of lower frequency The active lead-lag compensation filter 448 is provided the active washout filter output 447. The active lead-lag compensation filter 448 is configured to apply a phase lead or lag to the active washout filter output 447 based upon the latency between a power oscillation occurring at the POC 254, and the BESS 200 response. The active lead-lag compensation filter 448 can be configured with an active lead-lag compensation lead constant 449 and active lead-lag compensation lag constant 450, to set the desired phase lead or lag. The compensation lead constant 449 or the compensation lag constant 450 may be set based upon empirical observation based on how a particular battery energy storage system 200 performs. For example, if the amount of time it takes for the meter 255 to collect a particular electrical frequency value, to send that value to the power plant controller 212, for the power plant controller 212 to generate a command for the PCS 104, and for the PCS 104 to apply that command, is 0.5 seconds, then the active lead-lag compensation lead constant 449 and the active lead-lag compensation lag constant 450 will be configured to introduce a phase compensation corresponding to a delay of 0.5 seconds into the active power component adjustment 452, thereby creating an active lead-lag compensation filter output 451 signal, in order for the power plant controller 212 to apply the appropriate active power component adjustment 452 at a given instant to the oscillations from the POC 254.

The active limiter 459 is provided the active lead-lag compensation filter output 451, and shapes the waveform of the active lead-lag compensation filter output 451 waveform to fall between an active max limit 455 and an active min limit 456. This limiting is done to prevent the power plant controller 212 from providing too large of a dampening oscillation in attempting to counteract the oscillation at the POC 254. The active max limit 455 and the active min limit 456 can be configured based on the proportion of the dampening power of battery energy storage system 200 to the entire electrical grid, and based on the ability of the battery energy storage system 200 to generate large dampening oscillations. This filtered value is the active power component adjustment 452 provided by the active power sub-controller 400.

Additionally, as the active power component adjustment 452 is a difference based upon the frequency stored within the active power sub-controller measured value 440 and the frequency stored within the active power sub-controller reference value 441, in some examples the active power component adjustment 452 will be added back to a reference active power dispatch value 457. The reference active power dispatch value 457 is a reference value, like the active power sub-controller reference value 441. Often, the reference active power dispatch value 457 is either set remotely or locally, and the active power component adjustment 452 is added to the reference active power dispatch value 457 to make the target active power value 458. For example, if the active power component adjustment 452 is 100 kilowatt, and the reference active power dispatch value 457 is 500 kilowatt, then the active power component adjustment 452 will be added to the reference active power dispatch value 457 to produce a target active power value 458 of 600 kilowatt, which will then be provided to the power plant controller 212: in those examples, the power plant controller 212 can target specific power outputs, rather than applying a differential value to relatively increase or decrease the power output: Using absolute power values rather than relative power differentials can prevent the system from experiencing power drift where the power generated by the battery energy storage system 200 is not reflective of the active power sub-controller measured value 440 and the active power component adjustment 452.

Figure 4B:
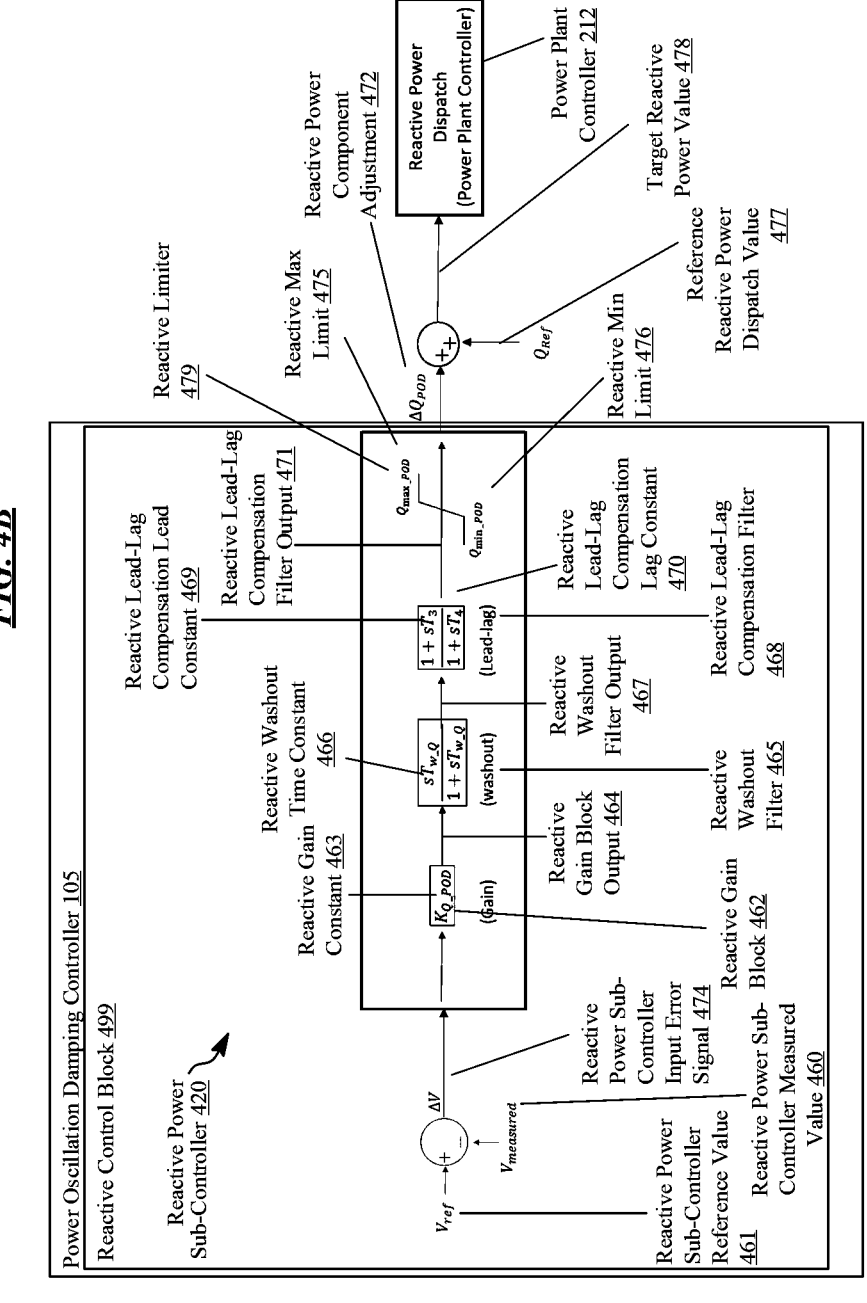
FIG. 4B is a control block diagram of the reactive power sub-controller of the power oscillation damping controller that can either be implemented physically or virtually.

FIG. 4B is a control block 499 diagram of the reactive power sub-controller 420 of the power oscillation damping controller 105 that can either be implemented physically or virtually. The reactive power-sub controller 420 is a series of physical circuits or virtualized circuits or transfer functions, configured to determine a reactive power component adjustment 472 to provide to the power plant controller 212. The power plant controller 212 is able to use the reactive power component adjustment 472 to alter the reactive power output of the battery energy storage system 200 in order to dampen power oscillations observed at the point of connection (POC) 254. The reactive power sub-controller 420 is primarily a reactive gain block 462, a reactive washout filter 465, a reactive lead-lag compensation filter 468, and a reactive limiter 479. However, a circuit may be attached between, or a transfer function may operate between, the meter 255 and the reactive gain block 462 to determine a reactive power sub-controller input error signal 474. The reactive power sub-controller input error signal 474 is the difference, error, or delta value in electrical voltage between an instant reactive power sub-controller measured value 460, which is the measurement provided by the meter 255, and a reactive power sub-controller reference value 461, which is a desired electrical voltage often associated with a reference voltage of the associated POC 254.

The reactive power sub-controller measured value 460 is an instantaneous voltage root mean square (RMS) value of the electrical voltage at the meter 255. The reactive power sub-controller 420 is continually providing a series of discretized reactive power component adjustments 472 to the power plant controller 112, thereby approximating an analog wave of reactive power component adjustments 472 devised to dampen the power oscillations of the electrical grid connected at the POC 254.

The reactive gain block 462 is provided the reactive power sub-controller input error signal 474 signal. In some examples, the reactive gain block 462 can be configured with a reactive gain constant 463.

The reactive washout filter 465 is provided the reactive gain block output 464 signal. The reactive washout filter 465 is designed to filter out reactive power sub-controller input error signal s 474 which are lower than a reactive washout time constant 466, in order for the POD controller 105 to not output de minimis reactive power component adjustments 472. The reactive washout time constant 466 can be configured in some cases.

The reactive lead-lag compensation filter 468 is provided the reactive washout filter output 467. The reactive lead-lag compensation filter 468 is configured to apply a phase lead or lag to the reactive washout filter output 467 based upon the latency between a power oscillation occurring at the POC 254, and the BESS 200 response. The reactive lead-lag compensation filter 468 can be configured with a reactive lead-lag compensation lead constant 469 and reactive lead-lag compensation lag constant 470, to set that amount phase lead or lag required. The reactive lead-lag compensation lead constant 469 or the reactive lead-lag compensation lag constant 470 may be set based upon empirical observation based on how a particular battery energy storage system 200 performs. For example, if the amount of time it takes for the meter 255 to collect a particular electrical voltage value, to send that value to the power plant controller 212, for the power plant controller 212 to generate a command for the PCS 104, and for the PCS to apply that command, is 0.5 seconds, then the reactive lead-lag compensation lead constant 469 and the reactive lead-lag compensation lag constant 470 will be configured to introduce a phase compensation corresponding to a delay of 0.5 seconds into the reactive power component adjustment 472, thereby creating a reactive lead-lag compensation filter output 471 signal, in order for the power plant controller 212 to apply the appropriate reactive power component adjustment 472 at a given instant to the oscillations from the POC 254.

The reactive limiter 479 is provided the reactive lead-lag compensation filter output 471, and shapes the waveform of the reactive lead-lag compensation filter output 471 waveform to fall between a reactive max limit 475 and a reactive min limit 476. This limiting is done to prevent the power plant controller 212 from providing too large of a dampening oscillation in attempting to counteract the oscillation at the POC 254. The reactive max limit 475 and the reactive min limit 476 can be configured based on the proportion of the dampening power of battery energy storage system 200 to the entire electrical grid, and based on the ability of the battery energy storage system 200 to generate large dampening oscillations. This filtered value is the reactive power component adjustment 472 provided by the reactive power sub-controller 420.

Additionally, as the reactive power component adjustment 472 is a difference based upon the voltage stored within the reactive power sub-controller measured value 460 and the voltage stored within the reactive power sub-controller reference value 461, in some examples the reactive power component adjustment 472 will be added back to a reference reactive power dispatch value 477. The reference reactive power dispatch value 477 is a reference value, like the reactive power sub-controller reference value 461. Often, the reference reactive power dispatch value 477 is either set remotely or locally, and the reactive power component adjustment 472 is added to the reference reactive power dispatch value 477 to make the target reactive power value 478. For example, if the reactive power component adjustment 472 is 100 kilovar, and the reference reactive power dispatch value 477 is 500 kilovar, then the two values will be added to produce a target reactive power value 478 of 600 kilovar, which will then be provided to the power plant controller 212: in those examples, the power plant controller 212 can target specific power outputs, rather than applying a differential value to relatively increase or decrease the power output: Using absolute power values rather than relative power differentials can prevent the system from experiencing power drift where the power generated by the battery energy storage system 200 is not reflective of the reactive power sub-controller measured value 460 and the reactive power component adjustment 472.

The power plant controller 212 may also be provided a combination of the reactive power component adjustment 472 and the active power component adjustment 452 as a unified power oscillation adjustment.

Therefore, FIGS. 2, 4A, and 4B depict a power oscillation damping controller 105 including a control block 498, 499 including one or more circuits 442, 445, 448, 452, 462, 465, 468, 472 configured to receive a meter 255 input 256A-N, 440, 460 and transmit a controller output 452, 472. The circuits 442, 445, 448, 459, 462, 465, 468, 479 may be implemented virtually as transfer functions. The meter 255 input 256A-N includes an active power sub-controller measured value 440 including an evident oscillation component of a power oscillation, a reactive power sub-controller measured value 460 including an alternative oscillation component of the power oscillation, or a combination thereof. The controller output includes an active power component adjustment 452 based on the active power sub-controller measured value 440 that configures or results in an evident dampening of the power oscillation, a reactive power component adjustment 472 based on the reactive power sub-controller measured value 460 that configures or results in an alternative dampening of the power oscillation, or a combination thereof.

The meter input 256A-N can include the active power sub-controller measured value 440 and the reactive power sub-controller measured value 460. The evident oscillation component can be an active power oscillation component of the power oscillation, and the alternative oscillation component is a reactive power oscillation component of the power oscillation.

The power oscillation damping controller 105 can be coupled to an array of batteries 110A-N, and the array of batteries 110A-N can be configured to alter an electrical output based upon the active power component adjustment 452.

The power oscillation damping controller 105 can be coupled to a power conversion system 104, and the power conversion system 104 can be configured to operate in either a capacitive or an inductive mode of operation based upon the reactive power component adjustment 472. The power conversion system 104 can operate in a grid-following or grid-forming control mode, and consequently the power oscillation damping controller 105 can operate the power conversion system 104 in a grid-following or a grid-forming control mode.

The electrical power produced by the array of batteries 110A-N can be coupled to an electrical grid, preferably at the POC 254, and the active power sub-controller measured value 440 and the reactive power sub-controller measured value 460 are provided by a meter 255 coupled between the power conversion system 105 and the electrical grid at the POC 254.

The power oscillation damping controller 105 can further include an active gain block 442 configured to receive an active power sub-controller input error signal 454 and transmit an active gain block output 444. The power oscillation damping controller 105 can further include an active washout filter 445 configured to receive the active gain block output 444 and transmit an active washout filter output 447. The power oscillation damping controller 105 can further include an active lead-lag compensation filter 448 configured to receive the active washout filter output 447 and transmit an active lead-lag compensation filter output 451. The power oscillation damping controller 105 can further include an active limiter 459 configured to receive the active lead-lag compensation filter output 451 and transmit the active power component adjustment 452.

The active gain block output 444 can be based on the active power sub-controller input error signal 454, as well as an active gain constant 443. The active washout filter output 447 can be based on the active gain block output 444 and an active washout time constant 446. The active lead-lag compensation filter output 451 is based on the active washout filter output 447, an active compensation lead constant 449 and an active compensation lag constant 450. The active power component adjustment 452 can be based on the active lead-lag compensation filter output 451, an active max limit 455, and an active min limit 456.

The power oscillation damping controller 105 can further include a reactive gain block 462 configured to receive a reactive power sub-controller input error signal 474 and transmit a reactive gain block output 464. The power oscillation damping controller 105 can further include a reactive washout filter 465 configured to receive the reactive gain block output 464 and transmit a reactive washout filter output 467. The power oscillation damping controller 105 can further include a reactive lead-lag compensation filter 468 configured to receive the reactive washout filter output 467 and transmit a reactive lead-lag compensation filter output 471. The power oscillation damping controller 105 can further include a reactive limiter 479 configured to receive the reactive lead-lag compensation filter output 471 and transmit the reactive power component adjustment 472.

The reactive gain block output 464 can be based on the reactive power sub-controller input error signal 474, as well as a reactive gain constant 463. The reactive washout filter output 467 can be based on the reactive gain block output 464 and a reactive washout time constant 466. The reactive lead-lag compensation filter output 471 is based on the reactive washout filter output 467, a reactive compensation lead constant 469 and a reactive compensation lag constant 470. The reactive power component adjustment 472 can be based on the reactive lead-lag compensation filter output 471, a reactive max limit 475, and a reactive min limit 476.

The active gain block 442, active washout filter 445, active compensation filter 448, active limiter 459, reactive gain block 460, reactive washout filter 465, reactive compensation filter 468, reactive limiter 479 can be implemented at a power plant controller 212 level.

FIGS. 2 and 4A-B also depict a battery energy storage system 200 including a power conversion system 104, configured to convert between a direct current power and an alternating current power. The battery energy storage system 200 further includes a battery core 259A including an array of battery cubes 110A-N, configured to provide the direct current power to the power conversion system 104, and a point of connection 254, configured to couple the power conversion system 104 to an electrical grid. The battery energy storage system 200 still further includes a meter 255, configured to measure an active power sub-controller measured value 440 of the alternating current power and a reactive power sub-controller measured value 460 of the alternating current power at the point of connection 254, and a power oscillation damping controller 105, configured to provide an active power component adjustment 452 based upon the active power sub-controller measured value 440 (e.g., the frequency), and a reactive power component adjustment 472 based upon the reactive power sub-controller measured value 460 (e.g. the RMS voltage).

The active power sub-controller measured value 440 can be taken from an active power component of the alternating current power, and the reactive power sub-controller measured value 460 can be taken from a reactive power component of the alternating current power. The alternating current power can include a power oscillation; and the power oscillation can be generated by the electrical grid.

The battery core 259A is configured to alter the direct current power to affect an active power output of the battery energy storage system 200 at the point of connection 254, based upon the active power component adjustment 452. The power conversion system 104 can be configured to operate in either capacitive or inductive mode of operation in order to affect a reactive power output of the battery energy storage system 200 at the point of connection 254, based upon the reactive power component adjustment 472.

FIG. 5 is a block diagram of a power oscillation damping (POD) controller 105 with virtually-implemented active power 400 and reactive power sub-controllers 420. In some examples, the circuitry in FIGS. 4A-B may be implemented virtually in a computing device as transfer functions, which receive input from the meter 255 and provide adjustment values to a power plant controller 112.

In such examples, the POD controller 105 includes a processor 530. The processor 530 serves to perform various operations, for example, in accordance with instructions or programming executable by the processor 530. For example, such operations may include operations related to communications with various battery energy storage system 200 elements, such as cores 259A-X or circuit breakers 260A-X. Although the processor 530 may be configured by use of hardwired logic, typical processors are general processing circuits configured by execution of programming. The processor 530 includes elements structured and arranged to perform one or more processing functions, typically various data processing functions. Although discrete logic components could be used, the examples utilize components forming a programmable CPU. The processor 530 for example includes one or more integrated circuit (IC) chips incorporating the electronic elements to perform the functions of the CPU. The processor 530 for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware. Although the illustrated examples of the processor 530 include only one microprocessor, for convenience, a multiprocessor architecture can also be used. A digital signal processor (DSP) or field-programmable gate array (FPGA) could be suitable replacements for the processor 530 but may consume more power with added complexity.

A memory 535 is coupled to the processor 230. The memory 535 is for storing data and programming. In the example, the memory 535 may include a flash memory (non-volatile or persistent storage) and/or a random-access memory (RAM) (volatile storage). The RAM serves as short term storage for instructions and data being handled by the processor 530 e.g., as a working data processing memory. The flash memory typically provides longer term storage.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The POD controller 105 may also include a network interface 532 coupled to the processor 530. The network interface 532 is configured to report oscillation damping data from the POD controller 105 to a networked server. Additionally, the network interface 532 can collect performance data from the battery cores 259A-X, including cubes 110A-N or the PCS 104, or the meter 255 if those components 259A-X, 110A-N, 104, 255 are equipped with a network interface.

The POD controller 105 may be implemented in a distributed manner: the processor 530 may be divided in to two or more processors, along with two or more memory devices 535. The processors 530 may work in parallel, and may also specialize and perform particular tasks. The memory 535 devices may store a full copy of all power oscillation damping data, or may specialize and store particular data relevant to a particular processor 530. In an example, the power oscillation controller 105 is divided into a local and remote grouping. A local processor 530, local memory 535, and local network interface 532 can calculate active power component adjustments 452 and reactive power component adjustments 472; while a remote processor 530, remote memory 535, and remote network interface 532 can maintain and update the values which control the virtualized circuits or transfer functions, which calculate the active power component adjustments 452 and the reactive power component adjustments 472.

To facilitate the process of calculating active power component adjustments 452 and reactive power component adjustments 472, the memory 535 includes several objects. In particular, the power oscillation damping programming 537 is the programming which calculates the active power component adjustment 553 and the reactive power component adjustment 573.

The virtualized version of the POD controller 105 implementing transfer functions follows the same steps in the same sequence as the non-virtualized circuits of FIGS. 4A-B. Therefore, the POD controller 105 maintains in memory equivalent objects, including a virtual active gain block 542, a virtual active washout filter 545, a virtual active lead-lag compensation filter 548, and a virtual active limiter 559, to simulate the active gain block 442, the active washout filter 445, the active lead-lag compensation filter 448, and the active limiter 459 of the active control block 498. The equivalent objects further include a virtual reactive gain block 562, a virtual reactive washout filter 565, a virtual reactive lead-lag compensation filter 568, and a virtual reactive limiter 579, to simulate the reactive gain block 462, the reactive washout filter 465, the reactive lead-lag compensation filter 468, and the reactive limiter 479 of the reactive control block 499.

These equivalent objects are informed by equivalent configuring inputs, including an active gain constant 543, an active washout time 546, an active compensation lead constant 549, an active compensation lag constant 550, an active max limit 555, and an active min limit 556 equivalent to those in FIG. 4A. The equivalent configuring inputs further include a reactive gain constant 563, a reactive washout time constant 566, a reactive compensation lead constant 569, a reactive compensation lag constant 570, a reactive max limit 575, and a reactive min limit 576 of the reactive control block 499 equivalent to those in FIG. 4B.

These equivalent objects with equivalent configuring inputs expect and produce equivalent inputs and outputs, including an active power sub-controller measured value 540, an active power sub-controller reference value 541, an active power sub-controller input error signal 554, an active gain block output 544, an active washout filter output 547, an active lead-lag compensation filter output 551, and an active power component adjustment 553 equivalent to those in FIG. 4A. The equivalent inputs and outputs further include a reactive power sub-controller measured value 560, a reactive power sub-controller reference value 561, a reactive power sub-controller input error signal 564, a reactive gain block output 564, a reactive washout filter output 567, a reactive lead-lag compensation filter output 571, and a reactive power component adjustment 573 equivalent to those of FIG. 4B.

Therefore, FIGS. 2, 4A-B, and 5 depict a power oscillation damping controller 105 including a processor 530 and a memory 535 accessible to the processor 530 and programmed to configure the power oscillation damping controller 105. The power oscillation damping controller 105 is configured to receive an active power sub-controller measured value 540 including an evident oscillation component of a power oscillation. The power oscillation damping controller 105 is configured to receive a reactive power sub-controller measured value 560 including an alternative oscillation component of a power oscillation. The power oscillation damping controller 105 is configured to calculate an active power component adjustment 553 based on the evident oscillation component of the active power sub-controller measured value 540. The power oscillation damping controller 105 is configured to calculate a reactive power component adjustment 573 based on the alternative oscillation component of the reactive power sub-controller measured value 560. The power oscillation damping controller 105 is configured to transmit the active power component adjustment 553. The power oscillation damping controller is configured to transmit the reactive power component adjustment 573.

Figure 6:
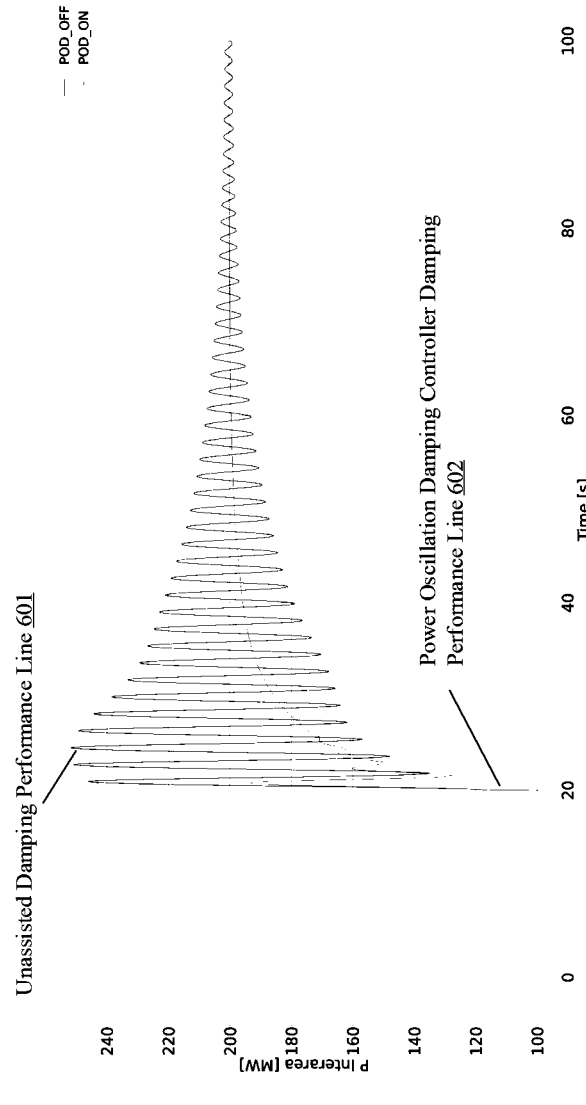
FIG. 6 is a power oscillation damping performance graph depicting an unassisted oscillation dampening, as well as power oscillation damping controller-assisted oscillation dampening.

FIG. 6 is a power oscillation damping performance graph 600 depicting an unassisted oscillation dampening performance line 601, as well as power oscillation damping controller-assisted oscillation dampening performance line 602. Unassisted damping performance line 601 shows a large electrical load coming online at twenty seconds bringing the power demand up from 100 megawatts to 200 megawatts (MW). The large increase in power demand causes the electrical grid to swing and experience large oscillations, which then dampen in a decaying manner over time until stabilizing at a limit approaching 200 MW.

Alternatively, the power oscillation damping controller damping performance line 602 depicts the same increase in power demand, but does not depict the same oscillatory pattern. Rather, based on the active power component adjustments 452 and the reactive power component adjustments 472, the oscillations rapidly decrease by about half every oscillation, such that at approximately ten seconds the oscillations have been substantially dampened, and the power output can rise to 200 MW at a stable rate. The stabilized power line of the power oscillation damping controller damping performance line 602 shows improvement in decreased oscillation, thereby stabilizing the electrical grid, and potentially preventing damage to the battery energy storage system 200 or other electrical devices coupled to the electrical grid.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second, or evident and alternative, and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A power oscillation damping controller comprising:

a control block including one or more circuits configured to receive a meter input and transmit a controller output, the meter input including:

i) an active power sub-controller measured value including an evident oscillation component of a power oscillation, ii) a reactive power sub-controller measured value including an alternative oscillation component of the power oscillation, or iii) a combination thereof;

the controller output including:

i) an active power component adjustment that configures or results in an evident dampening of the power oscillation, the active power component adjustment calculated based on the active power sub-controller measured value, ii) a reactive power component adjustment that configures or results in an alternative dampening of the power oscillation, the reactive power component adjustment calculated based on the reactive power sub-controller measured value, or iii) a combination thereof;

the power oscillation dampening controller being configured to compute a target active power value by adding the active power component adjustment that configures or results in the evident dampening of the power oscillation to a reference active power dispatch value, and compute a target reactive power value by adding the reactive power component adjustment that configures or results in the alternative dampening of the power oscillation to a reference reactive power value; and the power oscillation dampening controller being configured to output the target active power value and the target reactive power value to a power plant controller for mitigating power drift.

2. The power oscillation damping controller of claim 1, wherein:

the meter input includes the active power sub-controller measured value and the reactive power sub-controller measured value;

the evident oscillation component is an active power oscillation component of the power oscillation; and the alternative oscillation component is a reactive power oscillation component of the power oscillation.

3. The power oscillation damping controller of claim 2, wherein:

the power oscillation damping controller is coupled to an array of batteries.

4. The power oscillation damping controller of claim 2, wherein:

the power oscillation damping controller is coupled to a power conversion system, operating in grid-following or grid-forming control mode.

5. The power oscillation damping controller of claim 4, wherein:

the power conversion system is configured to operate in either capacitive or inductive mode of operation based upon the reactive power component adjustment that configures or results in the alternative dampening of the power oscillation.

6. The power oscillation damping controller of claim 4, wherein:

the electrical power is coupled to an electrical grid; and the active power sub-controller measured value and the reactive power sub-controller measured value are provided by a meter coupled between the power conversion system and the electrical grid.

7. The power oscillation damping controller of claim 1, further comprising:

an active gain block configured to receive an active power sub-controller input error signal and transmit an active gain block output;

an active washout filter configured to receive the active gain block output and transmit an active washout filter output;

an active lead-lag compensation filter configured to receive the active washout filter output and transmit an active lead-lag compensation filter output;

an active limiter configured to receive the active lead-lag compensation filter output and transmit the active power component adjustment that configures or results in the evident dampening of the power oscillation.

8. The power oscillation damping controller of claim 7, wherein:

the active gain block output is based on the active power sub-controller input error signal and an active gain constant;

the active washout filter output is based on the active gain block output and an active washout time constant; and the active lead-lag compensation filter output is based on the active washout filter output, an active compensation lead value and an active compensation lag value; and the active power component adjustment that configures or results in the evident dampening of the power oscillation is based on the active lead-lag compensation filter output, an active max limit, and an active min limit.

9. The power oscillation damping controller of claim 7, wherein:

the active gain block, active washout filter, active compensation filter, and active limiter are implemented at a power plant controller level.

10. The power oscillation damping controller of claim 1, further comprising:

a reactive gain block configured to receive a reactive power sub-controller input error signal and transmit a reactive gain block output;

a reactive washout filter configured to receive the reactive gain block output and transmit a reactive washout filter output;

a reactive lead-lag compensation filter configured to receive the reactive washout filter output and transmit a reactive lead-lag compensation filter output;

a reactive limiter configured to receive the reactive lead-lag compensation filter output and transmit the reactive power component adjustment that configures or results in the alternative dampening of the power oscillation.

11. The power oscillation damping controller of claim 10, wherein:

the reactive gain block output is based on the reactive power sub-controller input error signal and a reactive gain constant;

the reactive washout filter output is based on the reactive gain block output and a reactive washout time constant; and the reactive lead-lag compensation filter output is based on the reactive washout filter output, a reactive compensation lead value and a reactive compensation lag value; and the reactive power component adjustment that configures or results in the alternative dampening of the power oscillation is based on the reactive lead-lag compensation filter output, a reactive max limit, and a reactive min limit.

12. The power oscillation damping controller of claim 10, wherein:

the reactive gain block, reactive washout filter, reactive compensation filter, and reactive limiter are implemented at a power plant controller level.

13. A battery energy storage system, comprising:

a power conversion system, configured to convert between a direct current power and an alternating current power;

a battery core including an array of battery cubes, configured to provide the direct current power to the power conversion system;

a point of connection, configured to couple the power conversion system to an electrical grid and exchange the alternating current power between the electrical grid and the power conversion system;

a meter, configured to measure an active power sub-controller measured value of the alternating current power and a reactive power sub-controller measured value of the alternating current power at the point of connection; and a power oscillation damping controller, configured to provide an active power component adjustment that configures or results in an evident dampening of a power oscillation of the active power sub-controller measured value, the active power component adjustment calculated based upon the active power sub-controller measured value, and a reactive power component adjustment that configures or results in an alternative dampening of the power oscillation of the active power sub-controller measured value, the reactive power component adjustment calculated based upon the reactive power sub-controller measured value, the power oscillation dampening controller being configured to compute a target active power value by adding the active power component adjustment that configures or results in the evident dampening of the power oscillation to a reference active power dispatch value, and compute a target reactive power value by adding the reactive power component adjustment that configures or results in the alternative dampening of the power oscillation to a reference reactive power value; and the power oscillation dampening controller being configured to output the target active power value and the target reactive power value to a power plant controller for mitigating power drift.

14. The battery energy storage system of claim 13, wherein:

the active power sub-controller measured value is taken from an active power component of the alternating current power;

the reactive power sub-controller measured value is taken from a reactive power component of the alternating current power;

the active power component of the alternating current power is frequency; and the reactive power component of the alternating current power is voltage.

15. The battery energy storage system of claim 13, wherein:

the alternating current power includes the power oscillation; and the power oscillation is generated by the electrical grid.

16. The battery energy storage system of claim 13, wherein:

the battery core is configured to alter the direct current power to affect an active power output of the battery energy storage system, based upon the active power component adjustment that configures or results in the evident dampening of the power oscillation.

17. The battery energy storage system of claim 13, wherein:

the power conversion system is configured to operate in either capacitive or inductive mode of operation in order to affect a reactive power output of the battery energy storage system, based upon the reactive power component adjustment that configures or results in the alternative dampening of the power oscillation.

18. The battery energy storage system of claim 13, wherein the power oscillation damping controller further comprises:

an active gain block configured to increase the amplitude of the evident oscillation based on a difference between the active power sub-controller measured value and an active power sub-controller reference value, as well as an active gain constant;

an active washout filter configured to reject the evident oscillation in a steady state based on an active washout time constant;

an active lead-lag compensation filter configured to provision an active phase-lead characteristic to the evident oscillation based on an active compensation lead value and an active compensation lag value; and an active limiter configured to attenuate the evident oscillation above an active core electrical power threshold, outputting the active power component adjustment that configures or results in the evident dampening of the power oscillation.

19. The battery energy storage system of claim 13, wherein the power oscillation damping controller further comprises:

a reactive gain block configured to increase the amplitude of the alternative oscillation based on a difference between the reactive power sub-controller measured value and a reactive power sub-controller reference value, as well as a reactive gain constant;

a reactive washout filter configured to reject the alternative oscillation in a steady state based on a reactive washout time constant;

a reactive lead-lag compensation filter configured to provision a reactive phase-lead characteristic to the alternative oscillation based on a reactive compensation lead value and a reactive compensation lag value; and a reactive limiter configured to attenuate the alternative oscillation above a reactive core electrical power threshold, outputting the reactive power component adjustment that configures or results in the alternative dampening of the power oscillation.

20. A power oscillation damping controller comprising:

a processor;

a memory accessible to the processor and programmed to configure the power oscillation damping controller to:

receive an active power sub-controller measured value including an evident oscillation component of a power oscillation;

receive a reactive power sub-controller measured value including an alternative oscillation component of the power oscillation;

calculate, based on the evident oscillation component of the active power sub-controller measured value, an active power component adjustment that configures or results in an evident dampening of the power oscillation;

calculate, based on the alternative oscillation component of the reactive power sub-controller measured value, a reactive power component adjustment that configures or results in an alternative dampening of the power oscillation;

compute a target active power value by adding the active power component adjustment that configures or results in the evident dampening of the power oscillation to a reference active power dispatch value;

compute a target reactive power value by adding the reactive power component adjustment that configures or results in the alternative dampening of the power oscillation to a reference reactive power dispatch value; and output the target active power value and the target reactive power value to a power plant controller for mitigating power drift.

* * * * *